United States Patent [19]

Roussel et al.

[11] 3,903,121

[45] Sept. 2, 1975

[54] TELOMERS CONTAINING 1,3-DIOXANE, VINYL ACETATE, CHLORINE AND VINYL ALCOHOL

[75] Inventors: Daniel Roussel, Bully-les-Mines; Pierre Couderc, Aix Noulette; Paul Calin, Lens, all of France

[73] Assignee: Societe Chimeque des Charbonnages- CD F Chemie, France

[22] Filed: Dec. 21, 1973

[21] Appl. No.: 427,306

[30] Foreign Application Priority Data

Dec. 26, 1972 France .............................. 72.46197

[52] U.S. Cl................................ 260/340.7; 260/606

[51] Int. Cl.$^2$........................................ C07D 319/06
[58] Field of Search .................................. 260/340.7

[56] References Cited
UNITED STATES PATENTS 3,268,481    8/1966    Lerer ........................... 260/340.7 X

*Primary Examiner*—Anton H. Sutto

[57] ABSTRACT

Chlorine-containing telomers comprising 1,3-dioxane, vinyl acetate and vinyl alcohol units, having a limiting viscosity between 2 and $10^3$ cm$^3$.g and containing substantially no molecules having a degree of polymerization greater than 20 are useful for stabilizing aqueous formaldehyde solutions to give clear solutions.

4 Claims, No Drawings

TELOMERS CONTAINING 1,3-DIOXANE, VINYL ACETATE, CHLORINE AND VINYL ALCOHOL

The present invention relates to the use of chlorinated telomers based on vinyl acetate for the stabilisation of aqueous solutions of formaldehyde.

It is known to make telomers comprising at least 10% by weight of 1,3-dioxane groups of the formula:

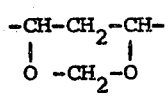

and 5 to 25 percent by weight of chlorine, the remainder consisting principally of acetate groups of the formula:

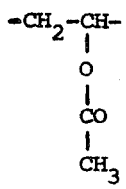

and alcohol groups of the formula:

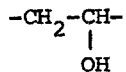

These telomers may be made by telomerizing vinyl acetate and carbon tetrachloride in the presence of a free radical generator; reacting the telomer thus prepared, in a solvent medium, with an oxidizing agent, in an amount substantially equal to 1 equivalent of free oxygen for 1 equivalent of chlorine contained in the telomer; acetalizing the product by treatment in an inorganic acid medium, with formaldehyde; and recovering the final product by neutralization and precipitation.

These telomers are useful for the stabilisation of aqueous solutions of formaldehyde. For this purpose, preferably 0.0005 to 0.05 percent by weight of a said telomer is added to an aqueous solution of formaldehyde. If desired, the telomer may be added to the aqueous solution of formaldehyde as a solution in for example, methanol, carbon tetrachloride, dimethylformamide or methyl ethyl ketone.

It has now been found that aqueous solutions of formaldehyde stabilised in this manner sometimes show a slight cloudiness. This cloudiness is probably caused by the presence, in the telomers used, of products with rather high molecular weights and/or of cross-linked products. Consequently it is desirable to remove from the telomers, the molecules having a high degree of polymerisation. More precisely, since the telomers normally prepared by the process mentioned above have an average degree of polymerisation of the order of 13 to 17 and a relatively wide molecular weight distribution, it has been found that it is desirable to remove from the said telomers the molecules with an average degree of polymerisation greater than 20. This operation, which can be carried out by any known fractionation process, gives a telomer which is completely soluble in industrial aqueous solutions of formaldehyde.

The most convenient method for removing the molecules of telomer with a relatively high average degree of polymerisation consists of treating the telomer with a suitable solvent or mixtures of solvents so that, by filtering, it is possible to remove the sparingly soluble high molecular weight telomer molecules. Telomers thus obtained are perfectly soluble in aqueous solutions of formaldehyde to be stabilised, and have a very high stabilising power.

The present invention thus provides telomers comprising: at least 10 percent by weight of 1,3-dioxane groups of the formula

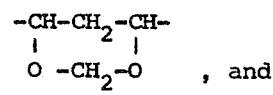

from 5 to 25 percent by weight of chlorine, the remainder consisting principally of acetate groups and alcohol groups of the above given formulae, having a limiting viscosity index, determined in dimethylformamide at 30°C, of between 2 and 10 $cm^3.g$, and containing substantially no molecules having a degree of polymerisation greater than 20. The present invention also provides aqueous formaldehyde solutions stabilised with such telomers, preferably in an amount from 0.0005 to 0.05 percent by weight.

According to a feature of the present invention, a process for producing suitable telomeric mixtures from crude telomers by removing a fraction with an average degree of polymerisation higher than 20, comprises dissolving the crude telomer in a mixture comprising: approximately 500 parts by weight of a 47 percent by weight aqueous formaldehyde solution approximately 210 parts by weight of methanol and approximately 90 parts by weight of methylal, and separating the soluble portion of the starting telomer. The latter is preferably used at the rate of approximately 6 percent by weight at 25°C, in the same solvent mixture.

This process may be operated by dissolving a quantity of crude telomer greater than 5 percent by weight in the mixture defined above and then filtering off the insoluble parts of the mixture. Alternatively a sufficient quantity of crude telomer may be dissolved completely in methanol or methylal or a mixture of the two, and an aqueous solution of formaldehyde is added to the solution obtained. A certain amount of precipitation then takes place, and the insoluble parts of the telomer are removed, for example by filtration.

Other mixtures of solvents may be used to fractionate the telomer, so as to separate the particularly soluble portions of the crude telomers. It is thus possible for technicians to find other solvents or mixtures of solvents suitable for effecting the fractionation. The products obtained have the same stabilising properties on aqueous solutions of formaldehyde as those obtained by employing the process described above.

The following Example illustrates the invention.

EXAMPLE

A telomer is prepared in the following way.

60 $cm^3$ of a mixture consisting of 880g of freshly distilled vinyl acetate, 120 g of carbon tetrachloride, and 8.8 g of benzoyl peroxide are introduced into a six litre reactor equipped with a stirrer, a temperature recording device and a pump through which the reagents can be introduced, the reactor being placed in a thermostatically controlled bath. The initial temperature in the reactor is 72°C. The temperature is raised gradually until it reaches approximately 80°C and the remainder of the mixture of the reagents is then introduced at the rate of 220 cm³/hour. As soon as the introduction is finished, the reaction is completed by raising the temperature to 85° – 86°C. The telomer produced is then taken up, at 60°C, in 3,026 g of glacial acetic acid containing 353 g of 110 volumes strength hydrogen peroxide.

Acetalisation is carried out at 75°C by introducing 63 g of concentrated sulphuric acid (98 percent) and 499 g of a 47.4 percent strength aqueous solution of formaldehyde into the above solution. For this experiment, the duration of the reaction is 8 hours.

At the end of the reaction, concentrated ammonia, corresponding to the amount of sulphuric acid introduced, is added and the telomer is precipitated by pouring the final solution into 68 l of water containing 136 g of sodium hydroxide.

After drying in vacuo, a crude telomer is obtained which has a limiting viscosity index of 8.3 cm³/g in dimethylformamide at 30°C. By chemical analysis, it is possible to determine that this product has the following quantitative composition:

| | |
|---|---|
| % (by weight) of chlorine | 9.5 |
| % (by weight) of vinyl acetate groups | 41 |
| % (by weight) of vinyl alcohol groups | 5 |
| % (by weight) of 1,3-dioxane groups | 19 |

The fractionation of this crude telomer is carried out in the following way. 40 g of telomer are dissolved in a mixture consisting of 80 g of methanol and 80 g of methylal. This solution is mixed with an aqueous solution, formed by mixing 442 g of an aqueous solution of formaldehyde containing 47.5 percent by weight of HCHO with 105 g of methanol, with stirring, at 40°C, and the mixture obtained is allowed to cool to 25°C.

A slight precipitate then forms; the suspension is filtered under nitrogen so as to remove the insoluble matter. A clear solution is thus obtained, containing approximately 5 percent by weight of telomeric products, which can be adjusted, moreover, to this exact concentration by adding methylal.

The process makes it possible to remove approximately 12 percent by weight of the telomer used. Investigation of this fractionation showed that:
the crude telomer had an average degree of polymerisation of the order of 15.5;
the fraction of telomer removed had an average degree of polymerisation of the order of 29 and quite a narrow molecular weight distribution; and
the fraction of telomer remaining in solution had an average degree of polymerisation of the order of 14.5.

The soluble portion of telomer, as obtained, makes excellent stabilisation of industrial aqueous solutions of formaldehyde possible under very diverse conditions. The clear solution obtained at the time of fractionation is preferably used, this being a solution which, apart from the telomeric product, does not contain any product other than those normally present in industrial aqueous solutions of formaldehyde.

It has been possible to determine the stability of various aqueous solutions of formaldehyde as a function of the temperature and of the concentration (by weight) of telomer added to the said solutions. This stability is assessed after storage for one month under the given conditions. The information which follows illustrates the results obtained:

for a 36 percent by weight solution of formaldehyde, stabilisation at
 −5°C requires the addition of 150 ppm of telomer,
 0°C requires the addition of 40 ppm of telomer and
 10°C requires the addition of 4 ppm of telomer;
for a 40 percent by weight solution of formaldehyde, stabilisation at
 6°C requires the addition of 135 ppm of telomer,
 10°C requires the addition of 50 ppm of telomer and
 20°C requires the addition of 5 ppm of telomer;
for a 45 percent by weight solution of formaldehyde, stabilisation at
 19°C requires the addition of 150 ppm of telomer,
 25°C requires the addition of 35 ppm of telomer and
 30°C requires the addition of 12 ppm of telomer;
and for a 50 percent by weight solution of formaldehyde, stabilisation at
 32°C requires the addition of 150 ppm of telomer and
 40°C requires the addition of 26 ppm of telomer.

All these solutions remain perfectly clear during storage.

We claim:

1. Telomers comprising at least 10% by weight of 1,3-dioxane groups of the formula:

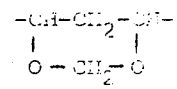

and from 5 to 25 percent by weight of chlorine, the remainder consisting principally of acetate groups of formula:

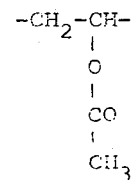

and alcohol groups of formula

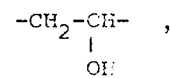

having a limiting viscosity index, determined in dimethylformamide at 30°C., of between 2 and 10 cm³.g, and containing substantially no molecules having a degree of polymerisation greater than 20.

2. Process for the preparation of a telomer as claimed in claim 1 which comprises admixing a crude telomer with a solvent comprising about 500 parts by weight of a 47 percent aqueous formaldehyde solution, about 210 parts by weight of methanol and about 90 parts by weight of methylal; and filtering said admixture to separate therefrom that portion of the crude telomer insoluble in said solvent; said crude telomer comprising at least 10% by weight of 1,3-dioxane groups of the formula:

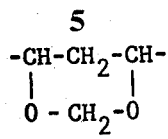

and from 5 to 25 percent by weight of chlorine, the remainder consisting principally of acetate groups of formula:

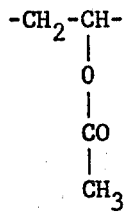

and alcohol groups of formula

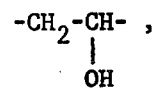

having a limiting viscosity index, determined in dimethylformamide at 30°C., of between 2 and 10 cm$^3$.g, and a portion of the molecules having a degree of polymerization greater than 20.

3. Process as defined in claim 2, wherein the amount of said crude telomer is greater than 5 percent by weight of the weight of said solvent.

4. Process as defined in claim 3, wherein the amount of said crude telomer is about 6 percent by weight of said solvent.

* * * * *